United States Patent
Wrobel et al.

(10) Patent No.: US 9,896,106 B1
(45) Date of Patent: Feb. 20, 2018

(54) COASTING DISTANCE DETERMINATION FOR COASTING ASSISTANCE SYSTEM

(71) Applicant: Toyota Motor Engineering & Manufacturing North America, Inc., Erlanger, KY (US)

(72) Inventors: Shannon A. Wrobel, Ann Arbor, MI (US); Joshua D. Payne, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/332,987

(22) Filed: Oct. 24, 2016

(51) Int. Cl.
*B60Q 9/00* (2006.01)
*B60W 30/18* (2012.01)
*G08G 1/0967* (2006.01)

(52) U.S. Cl.
CPC ..... *B60W 30/18154* (2013.01); *G08G 1/0967* (2013.01); *B60W 2400/00* (2013.01); *B60W 2510/18* (2013.01); *B60W 2520/10* (2013.01); *B60W 2550/22* (2013.01); *B60Y 2300/18158* (2013.01)

(58) Field of Classification Search
CPC ..... B60W 30/18127; B60W 30/18072; B60W 20/14; B60W 30/18109; B60W 30/18154; B60W 30/18009; B60W 10/184; B60L 7/10; B60Q 1/44; G08G 1/01; G08G 1/052
See application file for complete search history.

(56) References Cited

U.S. PATENT DOCUMENTS

| | | | |
|---|---|---|---|
| 5,239,472 A | 8/1993 | Long et al. | |
| 5,521,579 A | 5/1996 | Bernhard | |

(Continued)

FOREIGN PATENT DOCUMENTS

| | | |
|---|---|---|
| DE | 102010038106 | 4/2012 |
| DE | 102011083013 | 3/2013 |
| EP | 2790950 | 7/2015 |

OTHER PUBLICATIONS

Kircher et al. "Continuous Versus Intermittent Presentation of Visual Eco-Driving Advice" *VTI (Swedish National Road and Transport Research Institute)*; Transportation Research Part F 24; PP. 27-38; 2014.

(Continued)

*Primary Examiner* — Hongmin Fan
(74) *Attorney, Agent, or Firm* — Snell & Wilmer L.L.P.

(57) ABSTRACT

A system for adjusting timing of coasting assistance provided by a vehicle that is approaching an intersection where the vehicle will turn or is programmed or scheduled to turn. The system includes a speed sensor configured to detect vehicle speed data. The system includes a pedal unit configured to detect brake pedal position data. The system includes an electronic control unit (ECU) configured to detect when the brake pedal is engaged and released. The ECU is configured to detect a vehicle speed when the brake pedal is released. The ECU is configured to determine, at a determination time, whether the intersection is a green light intersection or a red light intersection. The ECU is configured to detect, at an application time, when the vehicle is approaching the intersection. The system also includes a display configured to display, at the application time, a coasting assistance instruction.

20 Claims, 7 Drawing Sheets

(56) References Cited

U.S. PATENT DOCUMENTS

| | | |
|---|---|---|
| 5,521,823 A | 5/1996 | Akita et al. |
| 5,815,072 A | 9/1998 | Yamanaka et al. |
| 5,838,259 A | 11/1998 | Tonkin |
| 6,208,927 B1 | 3/2001 | Mine et al. |
| 6,321,158 B1 | 11/2001 | DeLorme et al. |
| 6,336,038 B1 | 1/2002 | Nojima et al. |
| 6,584,395 B2 | 6/2003 | Satou et al. |
| 6,681,170 B2 | 1/2004 | Winner et al. |
| 6,694,806 B2 | 2/2004 | Kumagai et al. |
| 6,711,474 B1 | 3/2004 | Treyz et al. |
| 6,871,145 B2 | 3/2005 | Altan et al. |
| 7,212,905 B2 | 5/2007 | Grill |
| 7,237,203 B1 | 6/2007 | Kuenzner |
| 7,331,899 B2 | 2/2008 | Ortmann et al. |
| 7,404,784 B2 | 7/2008 | De Mersseman |
| 7,848,867 B2 | 12/2010 | Ueno |
| 8,083,015 B2 | 12/2011 | Kobayashi |
| 8,140,265 B2 | 3/2012 | Grush |
| 8,185,296 B2 | 5/2012 | Yokoyama et al. |
| 8,187,149 B2 | 5/2012 | Koenig |
| 8,204,665 B2 | 6/2012 | Takeuchi et al. |
| 8,246,506 B2 | 8/2012 | Matsubara et al. |
| 8,290,637 B2 | 10/2012 | Krupadanam et al. |
| 8,384,532 B2 | 2/2013 | Szczerba et al. |
| 8,483,949 B2 | 7/2013 | Taguchi et al. |
| 8,538,462 B2 | 9/2013 | Forstall et al. |
| 8,764,124 B2 | 1/2014 | Furuyama |
| 8,670,888 B1 | 3/2014 | Brenner |
| 8,680,979 B2 | 3/2014 | Hoffmeister |
| 8,706,379 B2 | 4/2014 | Jang |
| 8,718,891 B2 | 5/2014 | DeWitt et al. |
| 8,731,788 B2 | 5/2014 | Sujan et al. |
| 8,742,908 B2 | 6/2014 | Boudy |
| 8,767,379 B2 | 7/2014 | Whitaker |
| 8,784,267 B2 | 7/2014 | Staudinger et al. |
| 8,849,507 B2 | 9/2014 | Popp et al. |
| 8,917,171 B2 | 12/2014 | Anderson et al. |
| 8,966,654 B1 | 2/2015 | Kwak |
| 8,994,524 B2 | 3/2015 | Fritz et al. |
| 9,013,292 B2 | 4/2015 | Aberizk |
| 9,026,348 B2 | 5/2015 | Ichinokawa |
| 9,050,935 B2 | 6/2015 | Stefan et al. |
| 9,052,713 B2 | 6/2015 | Schulz et al. |
| 9,073,540 B2 | 7/2015 | Cauthen |
| 9,108,570 B2 | 8/2015 | Giangrande |
| 9,121,719 B2 | 9/2015 | Stankoulov |
| 9,168,896 B2 | 10/2015 | Kim |
| 9,205,740 B2 | 12/2015 | Jacobi et al. |
| 9,205,843 B2 | 12/2015 | Sannodo et al. |
| 9,207,091 B2 | 12/2015 | Ota et al. |
| 9,227,626 B2 | 1/2016 | Pandit et al. |
| 9,229,457 B2 | 1/2016 | Huelsebusch et al. |
| 9,238,412 B2 | 1/2016 | Kidston et al. |
| 9,242,631 B2 | 1/2016 | Tanaka et al. |
| 9,327,730 B2 | 5/2016 | Miller et al. |
| 9,347,784 B2 | 5/2016 | Inoue et al. |
| 2006/0125616 A1 | 7/2006 | Song |
| 2006/0190173 A1 | 8/2006 | Ogura |
| 2006/0290202 A1 | 12/2006 | Shibata et al. |
| 2007/0102208 A1 | 5/2007 | Okuda et al. |
| 2007/0129012 A1 | 7/2007 | Snow |
| 2008/0201050 A1 | 8/2008 | Placke et al. |
| 2010/0201505 A1 | 8/2010 | Honary et al. |
| 2010/0256848 A1 | 10/2010 | Sasaki et al. |
| 2011/0187520 A1 | 8/2011 | Filev et al. |
| 2012/0078496 A1 | 3/2012 | Lindhuber et al. |
| 2012/0095670 A1 | 4/2012 | Piggott |
| 2012/0330505 A1 | 12/2012 | Tsumori et al. |
| 2013/0162009 A1 | 6/2013 | Mitts et al. |
| 2013/0268162 A1 | 10/2013 | Ponziani |
| 2013/0274958 A1 | 10/2013 | Uno |
| 2014/0067225 A1* | 3/2014 | Lee .................. B60W 50/0097 701/93 |
| 2014/0156171 A1 | 6/2014 | Kono et al. |
| 2014/0156188 A1 | 6/2014 | Hart et al. |
| 2014/0172208 A1 | 6/2014 | Limbacher et al. |
| 2014/0324317 A1 | 10/2014 | Schilling et al. |
| 2014/0335994 A1 | 11/2014 | Otake |
| 2015/0259008 A1 | 9/2015 | Seguchi |
| 2015/0274169 A1 | 10/2015 | Attard et al. |
| 2015/0307097 A1 | 10/2015 | Steinmeyer et al. |
| 2015/0329119 A1 | 11/2015 | Sujan et al. |
| 2015/0337789 A1 | 11/2015 | Matsunaga et al. |
| 2016/0050315 A1 | 2/2016 | Malhotra et al. |
| 2016/0059864 A1 | 3/2016 | Feit et al. |
| 2016/0101780 A1 | 4/2016 | Park |
| 2016/0107527 A1 | 4/2016 | Amano |
| 2016/0257288 A1* | 9/2016 | Miller ...................... B60T 1/10 |

OTHER PUBLICATIONS

Kleine-Besten et al. "Navigation and Transport Telematics" *Handbook of Driver Assistance Systems*; pp. 1-35, 2015.

Koopmann et al. "Identification of Traffic States from Onboard Vehicle Sensors" *SAE International*; 8 pages; Aug. 7, 2016.

Leonard et al. "A Perception-Driven Autonomous Urban Vehicle" *Journal of Field Robotics*; vol. 25 No. 10; pp. 727-774; 2008.

Nozaki et al. "Effect of Active Effort in Eco-Driving Support System on Proficiency of Driving Skill" *SICE Annual Conference 2012*; pp. 646-651; 2012.

Seewald et al. "D13.1: Evaluation Plan and Scenario Definition" *ecoDriver Project* Retrieved from www.ecodriver-project.eu; Version 9; pp. 1-173; Mar. 10, 2014.

* cited by examiner

COASTING DISTANCE DETERMINATION FOR COASTING ASSISTANCE SYSTEM

BACKGROUND

1. Field

The present disclosure relates to a system and a method for improving vehicle fuel efficiency, occupant comfort, and safety, and more particularly to a system and a method for determining a coasting distance for a coasting assistance system.

2. Description of the Related Art

Hybrid vehicles may include a regenerative braking system. As the wheels of the vehicle turn, regenerative braking generates electricity from the turning of the axles connected to the wheels. The generated electricity may be stored in a battery and used to power an electric motor. In generating the electricity from the turning of the wheels, the regenerative braking provides resistance to the axles of the vehicle, resulting in a slowing down of the vehicle. By maximizing use of regenerative braking, use of friction braking may be minimized. Accordingly, minimized use of friction braking provides longer friction brake life. When a driver coasts by releasing the brake pedal and the accelerator pedal while the vehicle is moving, regenerative braking may generate electricity for the vehicle. Increased coasting may result in improved fuel efficiency and longer friction brake life.

SUMMARY

What is described is a system for adjusting a timing of the coasting assistance provided by a vehicle that is approaching an intersection where the vehicle will turn or is programmed or scheduled to turn. The system includes a speed sensor configured to detect vehicle speed data. The system also includes a pedal unit connected to a brake pedal and configured to detect brake pedal position data. The system also includes an electronic control unit (ECU) connected to the speed sensor and the pedal unit. The ECU is configured to detect when the brake pedal is engaged and released based on the brake pedal position data. The ECU is also configured to detect a vehicle speed when the brake pedal is released based on the vehicle speed data. The ECU is also configured to determine, at a determination time, whether the intersection is a green light intersection or a red light intersection based on the vehicle speed when the brake pedal is released. The ECU is also configured to detect, at an application time, when the vehicle is approaching the intersection. The system also includes a display connected to the ECU and configured to display, at the application time, a coasting assistance instruction including a green light coasting distance when the intersection is the green light intersection or a red light coasting distance when the intersection is the red light intersection.

Also described is a vehicle. The vehicle includes a speed sensor configured to detect vehicle speed data. The vehicle also includes a pedal unit connected to a brake pedal and configured to detect brake pedal position data. The vehicle also includes an electronic control unit (ECU) connected to the speed sensor and the pedal unit. The ECU is configured to detect when the brake pedal is engaged and released based on the brake pedal position data. The ECU is also configured to detect a vehicle speed when the brake pedal is released based on the vehicle speed data. The ECU is also configured to determine, at a first time, whether the intersection is a green light intersection or a red light intersection based on the vehicle speed when the brake pedal is released. The ECU is also configured to detect, at a second time, when the vehicle is approaching the intersection. The vehicle also includes a display connected to the ECU and configured to display, at the second time, a coasting assistance instruction including the green light coasting distance when the intersection is the green light intersection or the red light coasting distance when the intersection is the red light intersection.

Also described is a method of adjusting a timing of the coasting assistance provided by a vehicle that is approaching an intersection where the vehicle will turn or is programmed or scheduled to turn. The method includes detecting, by a speed sensor, vehicle speed data. The method also includes detecting, by a pedal unit connected to a brake pedal, brake pedal position data. The method also includes detecting, by an electronic control unit (ECU) connected to the speed sensor and the pedal unit, when the brake pedal is engaged and released based on the brake pedal position data. The method also includes detecting, by the ECU, a vehicle speed when the brake pedal is released. The method also includes determining, by the ECU at a determination time, whether the intersection is a green light intersection or a red light intersection based on the vehicle speed when the brake pedal is released. The method also includes detecting, by the ECU at an application time, when the vehicle is approaching the intersection. The method also includes displaying, by a display connected to the ECU at the application time, a coasting assistance instruction including the green light coasting distance when the intersection is the green light intersection or the red light coasting distance when the intersection is the red light intersection.

BRIEF DESCRIPTION OF THE DRAWINGS

Other systems, methods, features, and advantages of the invention will be or will become apparent to one of ordinary skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale, and may be exaggerated to better illustrate the important features of the invention. In the drawings, like reference numerals designate like parts throughout the different views, wherein:

DETAILED DESCRIPTION

Figure 1B:
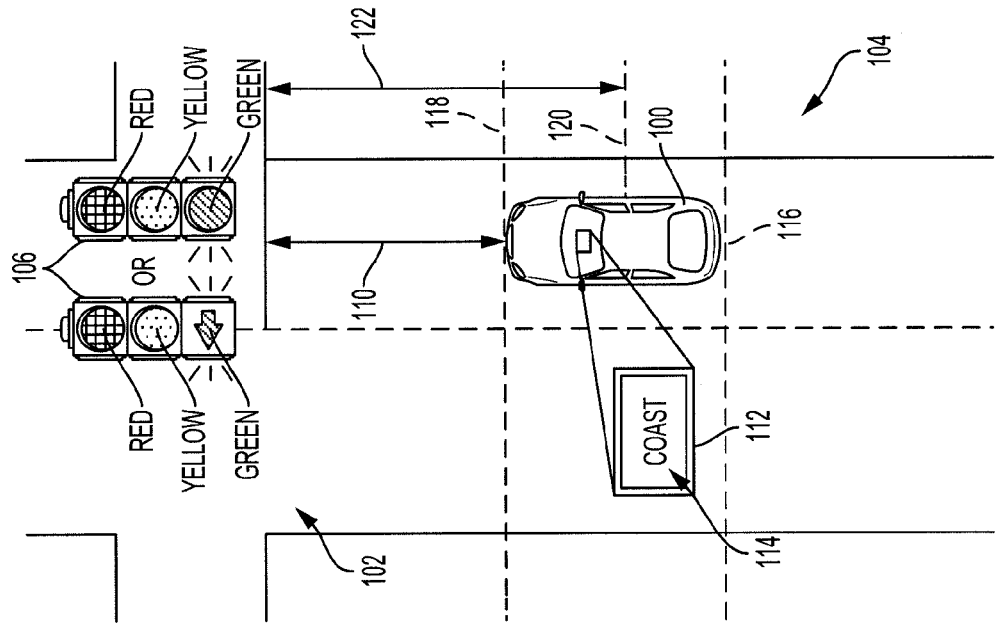
FIG. 1B illustrates the vehicle approaching an intersection, the vehicle providing a coasting assistance instruction for the green light, according to an embodiment of the invention.

Disclosed herein are systems and methods for adjusting a timing of the coasting assistance provided by a vehicle that is approaching an intersection where the vehicle will turn or is programmed or scheduled to turn. The systems and methods described herein provide several benefits and advantages, such as providing a more accurate coasting distance when the vehicle is making a turn. The vehicle may be capable of providing coasting assistance instructions to the driver or an autonomous or semi-autonomous system. The coasting assistance instructions may notify the driver as to when to disengage from the brake pedal and the accelerator pedal, so that regenerative braking may bring the vehicle to a stop while generating electricity. Coasting may improve the fuel efficiency of the vehicle. However, a proper coasting distance should be provided to the driver. For example, when the coasting distance is too long, the vehicle may travel at a slow speed for a frustratingly long time. When the coasting distance is too short, the regenerative braking may not generate the electricity it could have if a longer coasting distance was used. In order to provide the proper coasting distance, the vehicle may determine the likelihood of a traffic signal of the intersection showing a green light or a red light when the vehicle turns at the intersection.

When a green light is anticipated, a shorter coasting distance is used, compared to when a red light is anticipated. By providing the proper coasting distance, the comfort of the occupants and the fuel efficiency of the vehicle may be optimized, and coasting assistance is used more often by the driver. In addition, a vehicle using an inappropriately long coasting distance (e.g., using a red light coasting distance when the light is green) may draw some frustration by the drivers behind the vehicle. By using the proper coasting distance, other drivers may not be inconvenienced by the vehicle using coasting assistance.

An exemplary system includes a speed sensor configured to detect vehicle speed data. The system also includes a pedal unit connected to a brake pedal and configured to detect brake pedal position data. The system also includes an electronic control unit (ECU) connected to the speed sensor and the pedal unit. The ECU is configured to detect when the brake pedal is engaged and released based on the brake pedal position data. The ECU is also configured to detect a vehicle speed when the brake pedal is released based on the vehicle speed data. The ECU is also configured to determine, at a determination time, whether the intersection is a green light intersection or a red light intersection based on the vehicle speed when the brake pedal is released. The ECU is also configured to detect, at an application time, when the vehicle is approaching the intersection. The system also includes a display connected to the ECU and configured to display, at the application time, a coasting assistance instruction including a green light coasting distance when the intersection is the green light intersection or a red light coasting distance when the intersection is the red light intersection.

Figure 1A:
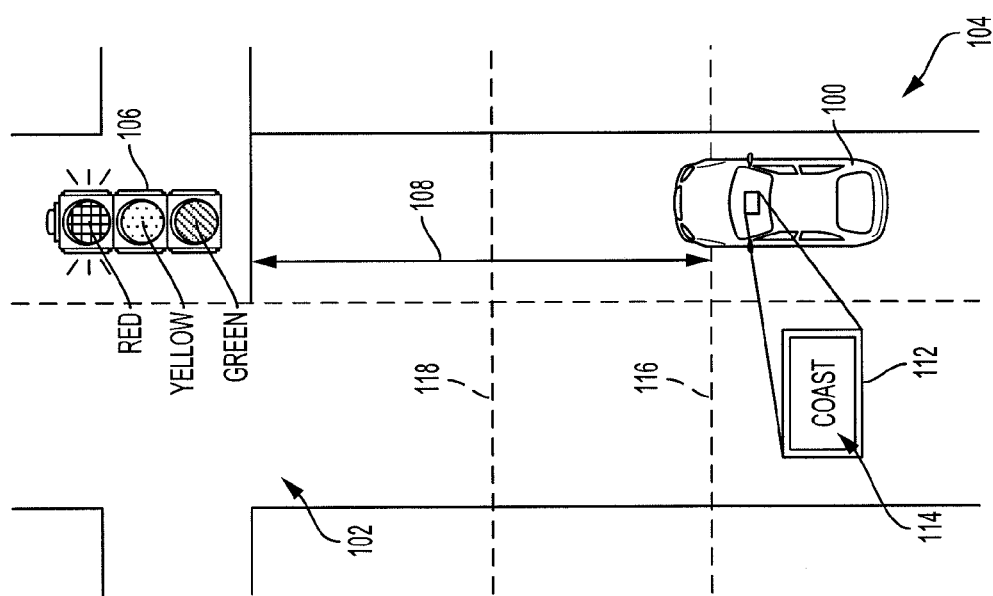
FIG. 1A illustrates a vehicle approaching an intersection, the vehicle providing a coasting assistance instruction for the red light, according to an embodiment of the invention.

FIG. 1A illustrates a vehicle 100. The vehicle 100 may be an electric vehicle, an internal combustion engine vehicle, a hybrid vehicle, a fuel cell vehicle, or any combination thereof. As used herein, "fuel" may refer to anything used to power the vehicle 100, such as gasoline or electricity. The vehicle 100 may be a vehicle operated by an individual, operated semi-autonomously or fully autonomously, operated remotely, or any combination thereof. As used herein, "driver," "user," or "operator" may refer to a human being driving vehicle 100 when vehicle 100 is a non-autonomous vehicle or operating in a non-autonomous mode. "Driver," "user," or "operator" may also refer to a computing system or control unit controlling the operation of vehicle 100 when vehicle 100 is a semi-autonomous or fully autonomous vehicle.

The vehicle 100 is approaching an intersection 102. When the vehicle 100 is approaching the intersection 102, it may be at an approaching location 104. The approaching location 104 may be within a range of the intersection 102. In some embodiments, the range is a distance measurement, and the approaching location 104 may be within 150 feet of the intersection 102, for example. In some embodiments, the range is a time measurement, and the approaching location 104 may be within 30 seconds of reaching the intersection 102 based on the current speed of the vehicle 100, for example.

As the vehicle 100 approaches the intersection, a coasting assistance system of the vehicle 100 may indicate to the driver of the vehicle 100 that the driver should coast. As used herein, coasting refers to release (or non-engagement) of both the accelerator pedal and the brake pedal, by the driver. Regenerative braking may be used while the vehicle 100 is coasting. The vehicle 100 may be a vehicle which uses regenerative braking to slow down the vehicle 100, such as a hybrid vehicle or an electric vehicle. As the wheels of the vehicle 100 turn, regenerative braking generates electricity from the turning of the axles connected to the wheels. The generated electricity may be stored in a battery and used to power an electric motor. In generating the electricity from the turning of the wheels, the regenerative braking provides resistance to the axles of the vehicle 100, resulting in a slowing down of the vehicle 100. By maximizing use of regenerative braking, use of friction braking may be minimized. Accordingly, minimized use of friction braking provides longer friction brake life. Therefore, increased coasting may result in increased regenerative braking use, which may result in increased friction brake life and increased fuel efficiency.

As shown in FIG. 1A, as the vehicle 100 approaches the intersection 102, the traffic signal (or traffic light) 106 displays a red light, indicating the vehicle 100 should stop when it reaches the intersection 102. As the vehicle 100 approaches the intersection 102, the coasting assistance system may indicate to the driver when to begin coasting. The coasting assistance instruction 114 may be displayed on a display 112 of the vehicle 100. The display 112 may be an entertainment unit display, which includes a navigation interface, or the display 112 may be a heads-up display projected onto a surface within the vehicle 100, such as a front windshield. The coasting assistance instruction 114 may be an audible sound from a speaker. The sound may be a chime, ring, or a spoken message, such as "Begin coasting now." When the vehicle 100 is a fully autonomous or semi-autonomous vehicle, the coasting assistance instruction may simply be an indication to a vehicle control unit responsible for operating the vehicle 100.

Upon receiving the coasting assistance instruction 114, the driver may release the brake pedal and the accelerator pedal. In some situations, the driver may then engage the brake pedal before reaching the intersection 102 to bring the vehicle 100 to a complete stop. In some situations, the driver may not engage the brake pedal before reaching the intersection 102, and the regenerative braking may bring the vehicle 100 to a complete stop. The timing of when the coasting assistance instruction 114 is provided may affect the driver experience. If the coasting assistance instruction 114 is provided too early, the vehicle 100 may be coasting for a relatively long time compared to a well-timed coasting assistance instruction 114. When the coasting period is relatively long, the driver and other occupants may feel uncomfortable, as the vehicle 100 may be travelling much slower than surrounding traffic. If the coasting assistance instruction 114 is provided too late, the vehicle 100 may be coasting for a relatively short period of time compared to a well-timed coasting assistance instruction 114. When the coasting period is relatively short, the driver may engage the brake pedal (thereby using friction brakes) and electricity generated from regenerative braking may not be maximized. When the coasting assistance instruction 114 is not provided in a well-timed manner, the driver may be less motivated to pay attention to the coasting assistance instruction 114.

The timing of providing of the coasting assistance instruction 114 may be based on a braking behavior associated with the vehicle 100. The braking behavior may include a record indicating braking distances, times, and locations that the system uses to determine an appropriate timing for providing the coasting assistance instruction 114. In some situations the vehicle 100 may slow down as the vehicle 100 approaches the intersection 102, regardless of the traffic signal displaying a red light or a green light, such as when the vehicle 100 is making a turn. In these situations, the braking behavior may be polarized, as a much longer coasting distance may be determined when the vehicle 100 approaches a red light as compared to the coasting distance determined when the vehicle 100 approaches a green light.

Therefore, the coasting assistance instruction 114 may be provided based on an anticipated signal of the traffic signal 106. When a red light on the traffic signal 106 is anticipated, the coasting assistance instruction 114 may be presented earlier than when a green light on the traffic signal 106 is anticipated. As shown in FIG. 1A, when the anticipated signal is a red light and the vehicle 100 is making a turn, the coasting assistance instruction 114 may be provided at the red light coasting location 116. The red light coasting location 116 is at a location that is a red light coasting distance 108 away from the intersection 102.

As shown in FIG. 1B, when the anticipated signal is a green light (or green arrow) and the vehicle 100 is making a turn, the coasting assistance instruction 114 may be provided at the green light coasting location 118. The green light coasting location 118 is at a location that is a green light coasting distance 110 away from the intersection 102.

When the vehicle 100 is going straight, through the intersection, and the light is green, the vehicle 100 may not always slow down. Therefore, a coasting assistance instruction 114 may not be presented when the vehicle 100 is going straight, through the intersection. When the vehicle 100 is making a right hand turn, the coasting assistance instruction 114 may be provided when the vehicle 100 is at the green light coasting distance 110 away from the intersection 102, or may be provided when the vehicle 100 is at a right turn coasting distance 122 away from the intersection 102. The right turn coasting distance 122 may be shorter than the red light coasting distance 108 and longer than the green light coasting distance 110. The right turn coasting distance 122 may be used when the vehicle 100 is making a right turn and a green light is anticipated on the traffic signal 106. The red light coasting distance 108 may be used when the vehicle 100 is making a right turn and a red light is anticipated on the traffic signal 106.

If the coasting assistance instruction 114 is presented at the green light coasting distance 110 when the traffic signal 106 is displaying a red light, the coasting distance may not be sufficiently long, and the driver of vehicle 100 may engage the brake pedal or engage the brake pedal swiftly in order to bring the vehicle 100 to a complete stop before reaching the intersection 102.

If the coasting assistance instruction 114 is presented at the red light coasting distance 108 when the traffic signal 106 is displaying a green light, the coasting distance may be too long, and the driver of the vehicle 100 may be uncomfortable and may draw the frustration of the drivers of the vehicles behind the vehicle 100 for driving slowly.

While the drawings and descriptions herein are with respect to a vehicle 100 travelling on the right side of the road, the systems and methods described herein may be performed in any jurisdiction where vehicles travel on the left side of the road.

Figure 2B:
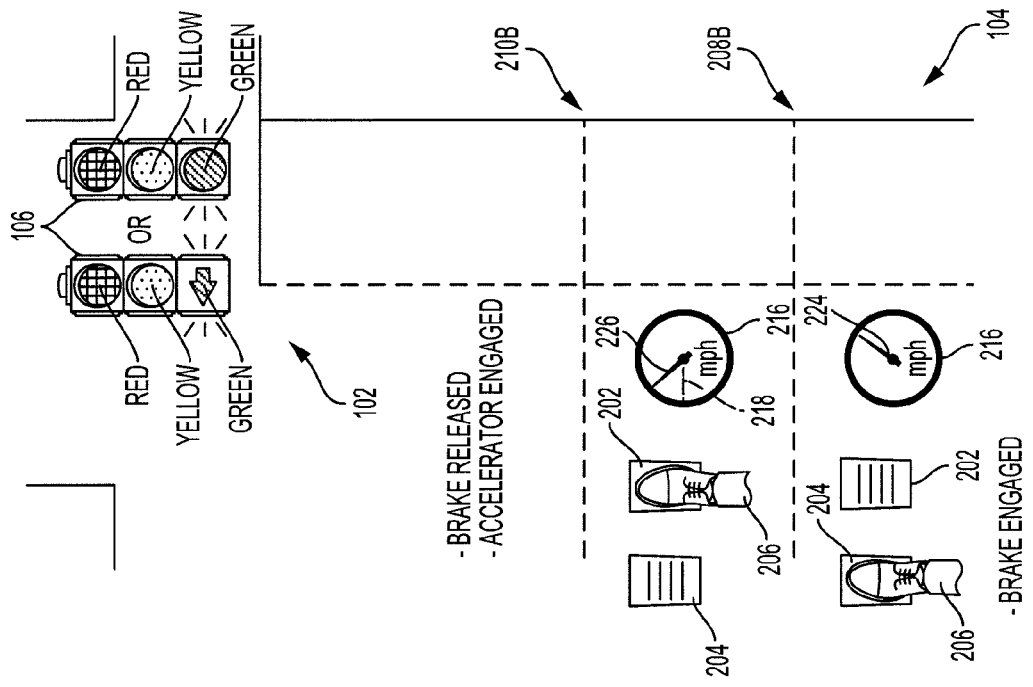
FIG. 2B illustrates detecting a green light based on brake pedal release, according to an embodiment of the invention.
Figure 2A:
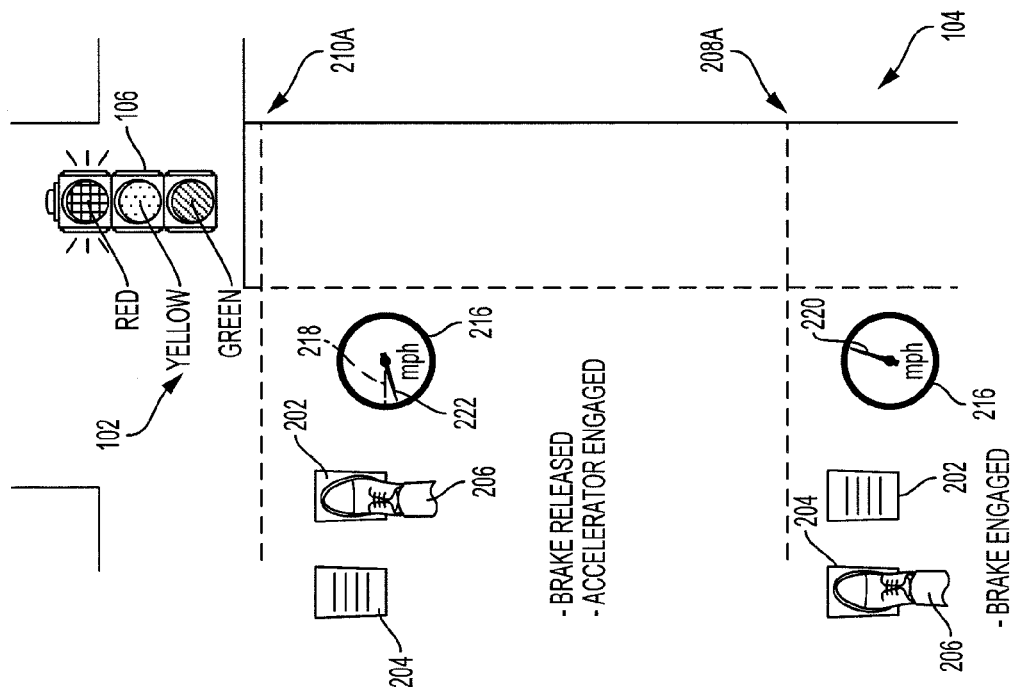
FIG. 2A illustrates detecting a red light based on brake pedal release, according to an embodiment of the invention.

In order to determine whether to use the green light coasting distance or the red light coasting distance in the coasting assistance instruction 114, the vehicle 100 determines a green light frequency and/or a red light frequency associated with the intersection 102. FIGS. 2A and 2B illustrate braking patterns used to detect whether the anticipated signal is a green light or a red light. The vehicle 100 may detect whether a green light or a red light is present when the vehicle 100 travels through the intersection 102. Over time, the vehicle 100 may detect whether the green light or the red light is present each time the vehicle 100 makes a turn at the intersection 102. The vehicle 100 may anticipate, based on past experience, whether the traffic signal is likely to have a green light or a red light when the vehicle 100 approaches the intersection 102 to make a turn, in order to provide the coasting assistance instruction at the appropriate distance.

The vehicle 100 may determine whether the green light or the red light is present based on the braking of the driver. FIG. 2A illustrates driver behavior when the traffic signal 106 is a red light, as the vehicle 100 approaches intersection 102 to make a turn. The driver 206 engages the brake pedal 204 at brake engagement time 208A. At brake engagement time 208A, the accelerator pedal 202 is not engaged and the speed sensor 216 detects that the vehicle 100 is traveling at a first, non-zero speed 220. The driver 206 continues to engage the brake pedal 204 until the vehicle 100 reaches the intersection 102 and comes to a stop. When the traffic signal 106 displays a green light, the driver 206 releases the brake pedal 204 and engages the accelerator pedal 202, at the brake release time 210A. At the brake release time 210A, the speed sensor 216 detects that the vehicle 100 is stationary, and traveling at zero speed 222 (e.g., 0 miles per hour, 0 kilometers per hour).

FIG. 2B illustrates driver behavior when the traffic signal is a green light or a green arrow, as the vehicle 100 approaches the intersection 102 to make a turn. The driver 206 engages the brake pedal 204 at the brake engagement time 208B. At the brake engagement time 208B, the accelerator pedal 202 is not engaged and the speed sensor 216 detects that the vehicle 100 is traveling at a first, non-zero speed 224. The driver 206 engages the brake pedal 204 until the brake release time 210B. At the brake release time 210B, the speed sensor 216 detects that the vehicle 100 is traveling at a second, non-zero speed 226. At the brake release time 210B, the accelerator pedal 202 is engaged, and the vehicle 100 proceeds to travel through the intersection 102 and makes a turn.

The vehicle 100 is able to detect, based on the vehicle speed at the brake release time 210, whether the traffic signal 106 displays a red light or a green light. When the vehicle speed at the brake release time 210 exceeds a speed threshold 218, the traffic signal 106 is determined to be a green light. When the vehicle speed at the brake release time 210 is less than the speed threshold 218, the traffic signal 106 is determined to be a red light.

For example, as shown in FIG. 2A, the vehicle speed 222 at the brake release time 210A is less than the speed threshold 218. Accordingly, the vehicle 100 determines the traffic signal 106 displays a red light. As shown in FIG. 2B, the vehicle speed 226 at the brake release time 210B exceeds the speed threshold 218. Accordingly, the vehicle 100 determines the traffic signal 106 is displaying a green light.

Figure 2C:
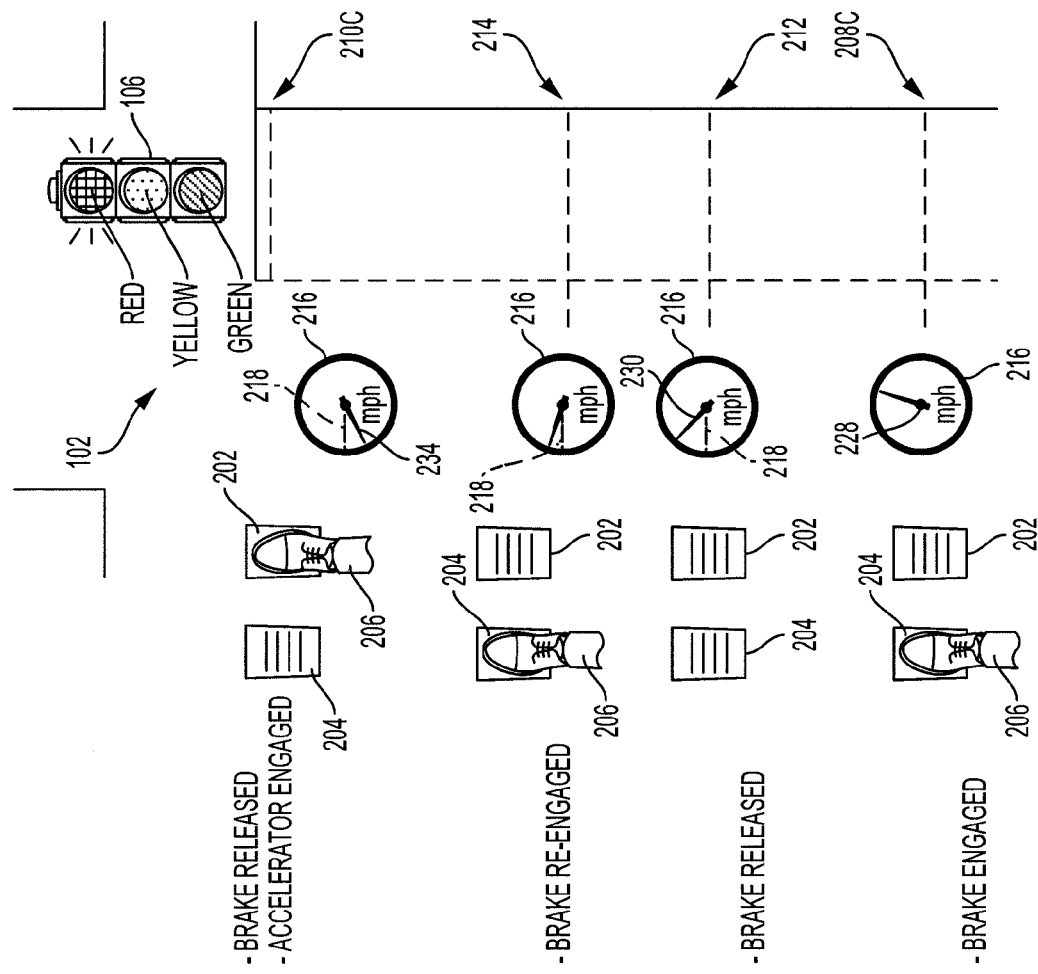
FIG. 2C illustrates detecting a red light based on brake pedal release and accelerator pedal engagement, according to an embodiment of the invention.

In some situations, the driver 206 approaching a red light, as shown in FIG. 2A, may modulate braking of the vehicle 100 by releasing the brake pedal 206 and re-engaging the brake pedal 206 between the brake engagement time 208A and the brake release time 210A. This release and re-engagement may result in the vehicle 100 improperly determining the traffic light 106 as having a green light instead of a red light. FIG. 2C illustrates an exemplary situation.

The driver 206 engages the brake pedal 204 at the brake engagement time 208C. At the brake engagement time 208C, the accelerator pedal 202 is not engaged and the speed sensor 216 detects that the vehicle 100 is traveling at a first, non-zero speed 228. The driver 206 continues to engage the brake pedal 204 until the intermediate brake release time 212. The driver 206 releases the brake pedal 204. The driver 206 re-engages the brake pedal 204 at the intermediate brake engagement time 214 until the vehicle 100 reaches the intersection 102 and comes to a stop. When the traffic signal 106 eventually shows a green light, the driver 206 releases the brake pedal 204 and engages the accelerator pedal 202, at the brake release time 210C.

At the intermediate brake release time 212, when the driver 206 releases the brake pedal 204, the vehicle speed 230, as detected by the speed sensor 216, exceeds the speed threshold 218. If the vehicle 100 is configured to detect the vehicle speed whenever the driver 206 engages the brake pedal 204 as the vehicle 100 approaches the intersection 102, the vehicle 100 may detect the vehicle speed 230 at the intermediate brake release time 212. Doing so may result in the vehicle 100 incorrectly determining the traffic light 106 is displaying a green light.

Instead, the vehicle 100 may determine a final brake release time (e.g., brake release time 210C). The vehicle 100 may determine the final brake release time by determining when the accelerator pedal 202 is engaged after the brake pedal 204 is released. In some embodiments, the gap in time, between when the accelerator pedal 202 is engaged after the brake pedal 204 is released, is less than an acceleration time threshold. That is, the accelerator pedal 202 is engaged within the acceleration time threshold after the brake pedal 204 is released. By using the final brake release time, the vehicle 100 detects the vehicle speed 234 at the brake release time 210C, which is less than the speed threshold 218. At the brake release time 210C, the speed sensor 216 detects that the vehicle 100 is stationary, and traveling at zero speed 234 (e.g., 0 miles per hour, 0 kilometers per hour). Accordingly, the vehicle 100 accurately determines the traffic signal 106 is showing a red light.

Figure 3:
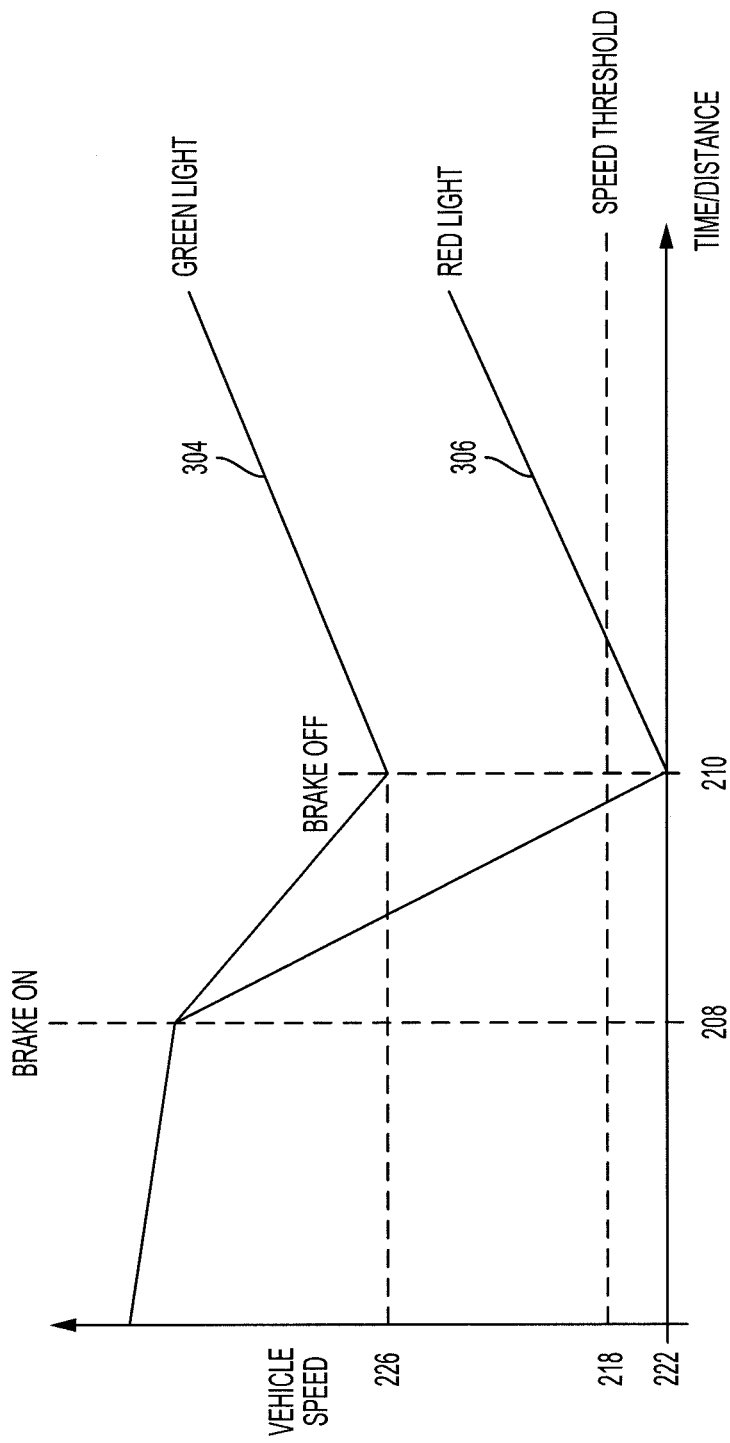
FIG. 3 illustrates a graph of vehicle speed versus time or distance, according to an embodiment of the invention.

FIG. 3 illustrates a graph of vehicle speed versus time or distance. While the graph is described herein relative to time, distance may be used, and reference times may be replaced with reference distances. At the brake engagement time 208, as shown in FIG. 2A and FIG. 2B, the brake pedal 204 is engaged, and the vehicle speed falls. When the traffic signal 106 is a red light 306, the vehicle speed may fall more rapidly, as the brake pedal 204 may be engaged to a higher degree. When the traffic signal 106 is a green light 304, the vehicle speed may fall less rapidly, as the brake pedal 204 may be less engaged.

At the brake release time 210, also as shown in FIG. 2A and FIG. 2B, the brake pedal 204 is released. The accelerator pedal 202 is engaged and the vehicle speed rises. When the traffic signal 106 is a red light 306, at the brake release time 210, the vehicle speed 222 is less than the speed threshold 218. When the traffic signal 106 is a green light 304, at the brake release time 210, the vehicle speed 226 exceeds the speed threshold 218. The brake release time 210 may be the final brake release time, as described herein with respect to FIG. 2C, whereby the accelerator pedal 202 is engaged after release of the brake pedal 204.

Figure 4:
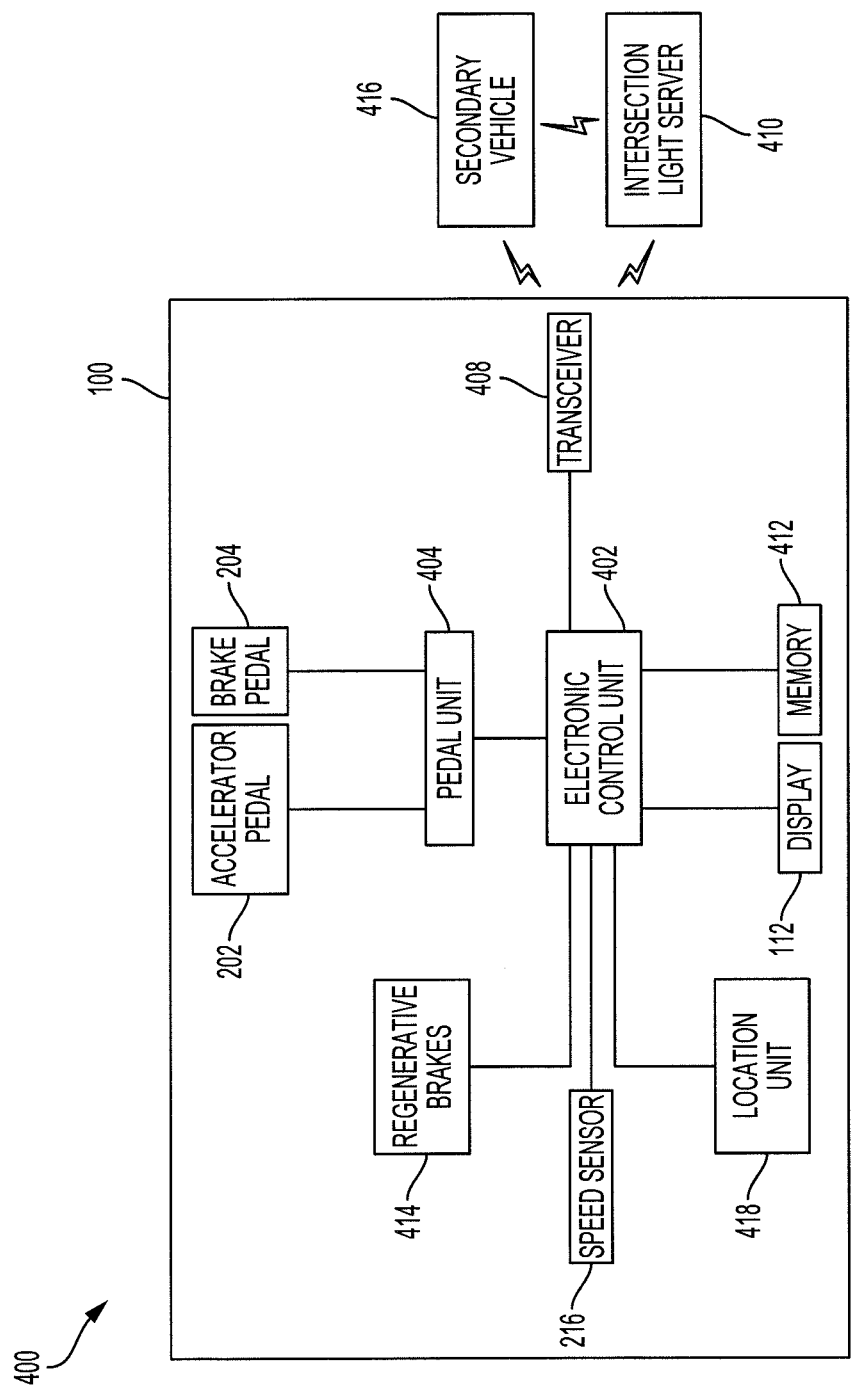
FIG. 4 illustrates a block diagram of the system, according to an embodiment of the invention.

FIG. 4 illustrates a block diagram of the system 400, which includes the vehicle 100. The vehicle 100 includes, for example, an electronic control unit (ECU) 402. The ECU 402 is configured to control functions of the vehicle 100. The ECU 402 is connected to the pedal unit 404 connected to the accelerator pedal 202 and the brake pedal 204, the speed sensor 216, regenerative brakes 414, the display 112, the memory 412, the location unit 418, and the transceiver 408 communicatively coupled to an intersection light server 410 and/or the secondary vehicle 416. The ECU 402 may be one or more ECUs implemented as a single ECU or in multiple ECUs. The ECU 402 may include one or more processors or controllers specifically designed for controlling one or more coasting features.

The pedal unit 404 is connected to the ECU 402 and is configured to detect pedal data and communicate the pedal data to the ECU 402. The pedal data may be associated with the accelerator pedal 202 and/or the brake pedal 204. The pedal data may indicate a level of engagement of the accelerator pedal 202 and/or the brake pedal 204. The level of engagement may be expressed in terms of a value associated with engagement, such as 2 for light engagement or 10 for heavy engagement of the accelerator pedal 202 or the brake pedal 204. The level of engagement may be expressed in terms of a percentage depression of the accelerator pedal 202 or the brake pedal 204, such as 0% for no pedal engagement and 100% for maximum pedal engagement.

The speed sensor 216 is connected to the ECU 402 and is configured to detect vehicle speed data. The speed sensor 216 may be a speedometer, for example. The vehicle speed data may be in units of distance per time, such as miles per hour or kilometers per hour.

The display 112 is connected to the ECU 402 and configured to display a coasting assistance instruction 114, as illustrated in FIG. 1A and FIG. 1B. The display 112 may be a heads-up display projected onto a window, or may be an entertainment unit or navigation unit display, for example.

The location unit 418 is connected to the ECU 402 and is configured to detect location data. The location unit 418 may include a global positioning system (GPS) unit configured to receive GPS signals to determine a location of the vehicle 100. The speed sensor 216 may use the received GPS signals to determine a vehicle speed by determining a distance travelled between two points and the time taken to travel between the two points.

The memory 412 is connected to the ECU 402 and configured to store map data, green light coasting distance, red light coasting distance, total light count, green light count, red light count, a frequency threshold of green light count to total light count, a speed threshold for detecting a green light or a red light based on the vehicle speed, acceleration time threshold, and any other value or threshold, as described herein.

The regenerative brakes 414 are connected to the ECU 402. As described herein, the regenerative brakes 414 are configured to generate electricity from the rotating of one or more axles based on the rotating of the tires, as the vehicle 100 moves. In generating electricity, the regenerative brakes 414 may provide resistance, resulting in braking of the vehicle 100.

The regenerative brakes 414 may have one or more resistance settings. The resistance settings may determine the amount of electricity generated and/or a braking power from the regenerative brakes 414. For example, when the regenerative brakes 414 have a resistance setting of "high," more electricity may be generated from regenerative braking and/or the braking distance may become shorter than when the regenerative brakes 414 have a resistance setting of "low" or "medium."

The resistance setting of the regenerative brakes 414 may affect the coasting distances (e.g., green light coasting distance and red light coasting distance). As the resistance setting of the regenerative brakes 414 increases, the coasting distances may correspondingly decrease. Conversely, as the resistance setting of the regenerative brakes 414 decreases, the coasting distances may correspondingly increase. The resistance setting may be continuous, in that the driver 206 may set any value between two bounds for the resistance setting, such as setting any value between 0 and 100. The resistance setting may be discrete, in that the driver 206 may set the resistance setting to one of a number of predetermined resistance settings, such as 0, 2, 4, 6, 8, and 10, or "low," "medium," and "high." While an increased resistance setting is described herein as providing a shorter braking distance, the resistance settings may be configured such that a lower resistance setting provides a shorter braking distance. The regenerative brakes 414 may communicate resistance setting data to the ECU 402 indicating a resistance setting of the regenerative brakes 414. The ECU 402 may determine the length of the coasting distances (e.g., green light coasting distance and red light coasting distance) based on the resistance setting data.

The transceiver 408 is connected to the ECU 402 and is configured to communicate with the intersection light server 410 and/or a secondary vehicle 416. The transceiver 408 may transmit and receive intersection light data, including green light coasting distance, red light coasting distance, green light frequency (e.g., green light count/total light count), and red light frequency (e.g., red light count/total light count). The intersection light data may be unique to the particular intersection, and intersections may be identified using a unique intersection identifier. In some embodiments, the intersection identifier is a set of global coordinates of the intersection. In some embodiments, the intersection identifier is an ordered pair of the streets that intersect to form the intersection. The intersection light data may be communicated to the intersection light server 410, which may aggregate intersection light data received from a plurality of vehicles, and transmit the aggregate intersection light data to other vehicles, such as the secondary vehicle 416. The aggregate intersection light data may include an aggregate total light count associated with an aggregate number of times the plurality of vehicles travelled through the intersection 102, an aggregate green light count associated with an aggregate number of times a green light was present when the plurality of vehicles travelled through the intersection 102, and an aggregate red light count associated with an aggregate number of times a red light was present when the plurality of vehicles travelled through the intersection 102. Using this aggregate intersection light data, each vehicle may more accurately determine a green light frequency and/or a red light frequency for the intersection 102. In addition, the intersection light data may be communicated directly from the vehicle 100 to other vehicles, such as the secondary vehicle 416. The secondary vehicle 416 may use the directly communicated intersection light data from the vehicle 100 to supplement the intersection light data of the secondary vehicle 416 to more accurately determine a green light frequency and/or a red light frequency.

The transceiver 408 may be a receiver and/or a transmitter configured to receive and transmit data. The transceiver 408 may include an antenna capable of transmitting and receiving wireless communications to and from the intersection light server 410 and/or the secondary vehicle 416. For example, the antenna may be a Bluetooth or Wi-Fi antenna, a cellular radio antenna, and/or a radio frequency identification (RFID) antenna or reader. The transceiver 408 may use a vehicle-to-vehicle communications protocol to communicate the intersection light data to the secondary vehicle 416.

Figure 5:
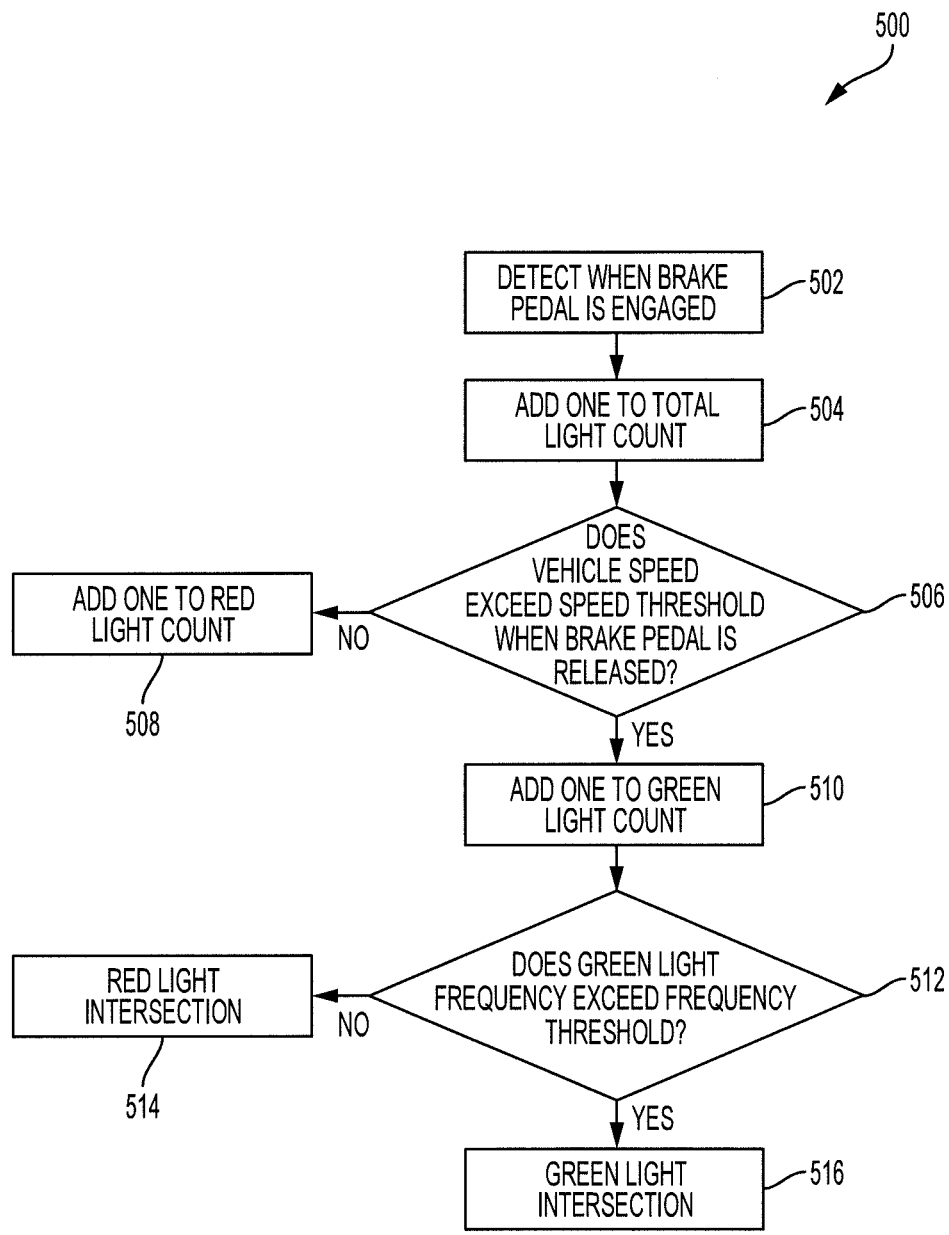
FIG. 5 illustrates an example of a flowchart describing the system, according to an embodiment of the invention.

FIG. 5 illustrates an example of a flowchart describing operation of the system. The process 500 may be used by a vehicle such as the vehicle 100. The vehicle 100 detects when the brake pedal 204 is engaged (step 502). The ECU 402 of the vehicle 100 may detect when the brake pedal 204 is engaged based on the pedal data received from the pedal unit 404.

When the brake pedal 204 is engaged, the vehicle 100 may determine the vehicle 100 is approaching an intersection, and a total light count is incremented (step 504). The vehicle 100 may determine the vehicle 100 is approaching an intersection based on map data stored in the memory 412, and location data detected by the location unit 418. The total light count may be stored in the memory 412 and may be associated with a number of times the vehicle 100 has travelled through the intersection 102 and made a turn.

The ECU 402 determines whether a vehicle speed exceeds a speed threshold (e.g., speed threshold 218) when the brake pedal 204 is released (step 506).

The vehicle speed may be determined based on the vehicle speed data detected by the speed sensor 216. When the vehicle speed exceeds the speed threshold when the brake pedal 204 is released, the green light count is increased by one (step 510). When the vehicle speed exceeds the speed threshold when the brake pedal 204 is released, the red light count is increased by one (step 508). Steps 502 to 508/510 may be repeated for every intersection the vehicle 100 approaches where the vehicle 100 is making a turn.

The ECU 402 may use the green light count, the red light count, and the total light count to determine a green light frequency (e.g., green light count/total light count) and/or a red light frequency (e.g., red light count/total light count). The ECU 402 determines whether the green light frequency exceeds a frequency threshold (step 512).

When the green light frequency exceeds the frequency threshold, the intersection is determined to be a green light intersection and a green light coasting distance is used in the coasting assistance instruction 114 (step 516). When the green light frequency is less than the frequency threshold, the intersection is determined to be a red light intersection and a red light coasting distance is used in the coasting assistance instruction 114 (step 514). Steps 512 to 514/516 may be repeated each time the vehicle 100 approaches an intersection where the vehicle 100 is making a turn.

The frequency threshold may be a value such that a vehicle 100 approaching the intersection 102 may reliably anticipate a green light on the traffic signal 106 when the green light frequency exceeds the frequency threshold. For example, the frequency threshold may be 90%, whereby a green light may be anticipated when a green light was present more than 90% of the times the vehicle 100 made a turn at the intersection 102. In some embodiments, various intersections may be associated with different frequency thresholds. In some embodiments, all intersections are associated with the same frequency threshold.

The light patterns of a traffic signal (e.g., traffic signal 106) may vary based on the time of day, day of the week, or day of the month. Accordingly, the green light count and the red light count may vary based on the time of day, the day of the week, or the day of the month. In some embodiments, the time is determined, and the green light count, the red light count, and the total light count associated with the determined time is used to determine the green light frequency and the red light frequency, and therefore whether the intersection 102 is a green light intersection or a red light intersection.

In an example embodiment, in the morning, the intersection 102 may have a total light count of 100, a green light count of 50, and a red light count of 50. The frequency threshold may be 75%. Therefore, when the vehicle 100 approaches the intersection 102 in the morning, the intersection is a red light intersection and a red light coasting distance is used in the coasting assistance instruction.

In another example embodiment, in the evening, the intersection 102 may have a total light count of 500, a green light count of 450, and a red light count of 50. The frequency threshold may be 75%. Therefore, when the vehicle 100 approaches the intersection 102 in the evening, the intersection 102 is a green light intersection and a green light coasting distance is used in the coasting assistance instruction.

In yet another example embodiment, on Sundays, the intersection 102 may have a total light count of 200, a green light count of 180, and a red light count of 20. The frequency threshold may be 75%. Therefore, when the vehicle 100 approaches the intersection 102 on a Sunday, the intersection 102 is a green light intersection and a green light coasting distance is used in the coasting assistance instruction 114.

Figure 6:
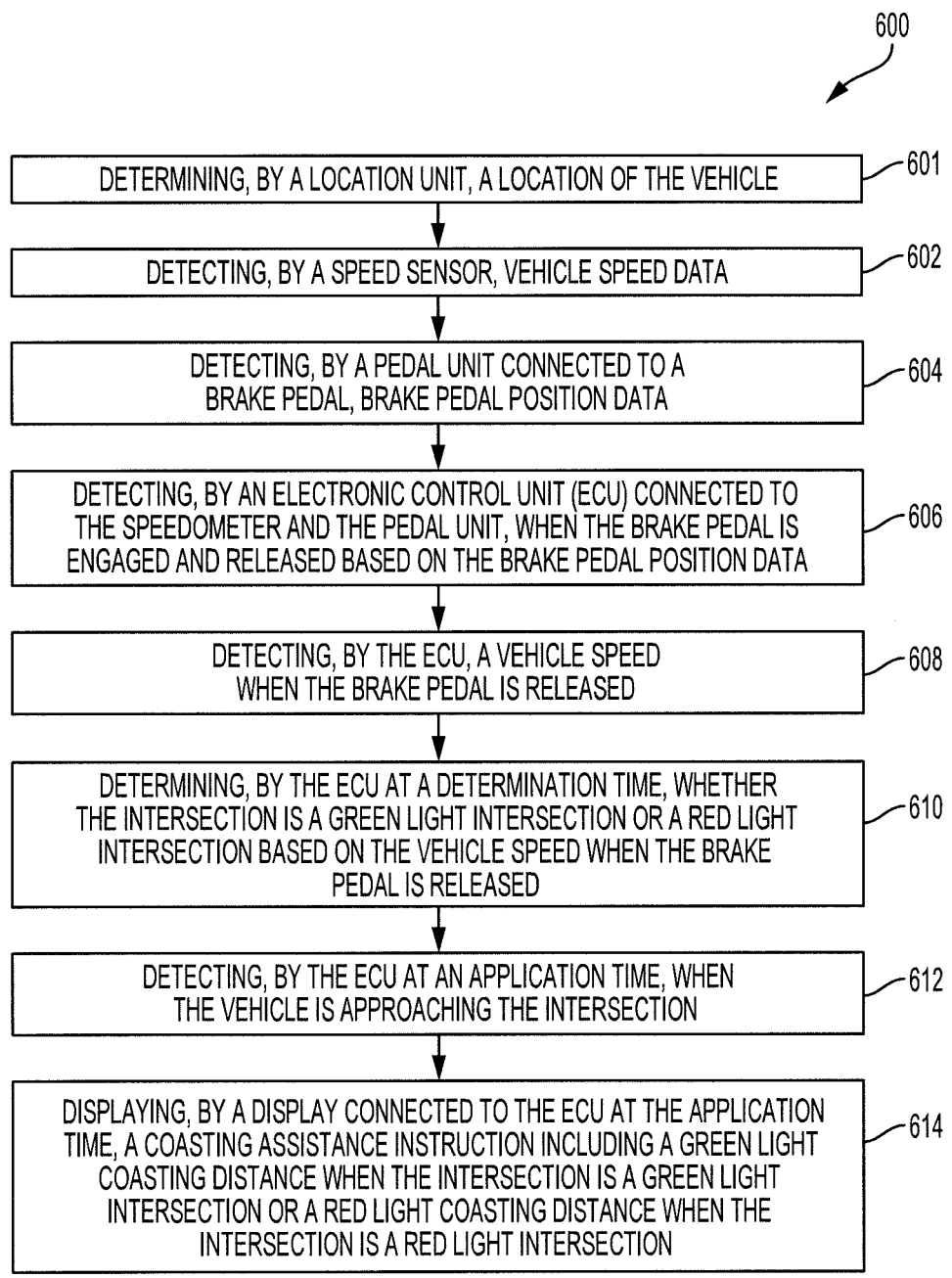
FIG. 6 illustrates an example of a flowchart describing operation of the system, according to an embodiment of the invention.

FIG. 6 illustrates an example of a flowchart describing operation of the system. The process 600 may be used by a vehicle such as the vehicle 100.

The vehicle 100 may be approaching the intersection 102. The ECU 402 may determine a location of the vehicle 100 using map data stored in the memory 412 and location data detected by the location unit 418 (step 601). The ECU 402 may determine the vehicle 100 is approaching the intersection 102 when the location of the vehicle 100 is at the approaching location 104.

A speed sensor 216 detects vehicle speed data (step 602). The speed sensor 216 may continuously detect the vehicle speed data while an engine and/or a motor of the vehicle 100 is turned on.

A pedal unit 404 detects brake pedal position data (step 604). The pedal unit 404 may be connected to the brake pedal 204 of the vehicle 100. The brake pedal position data may indicate whether the brake pedal 204 is engaged or released, and if the brake pedal 204 is engaged, to what degree.

An electronic control unit (ECU) 402 connected to the speed sensor 216 and the pedal unit 404 detects when the brake pedal 204 is engaged and released based on the brake pedal position data (step 606). In some embodiments, the ECU 402 detects when the brake pedal 204 is engaged when the brake pedal position data is a non-zero value, and the ECU 402 detects when the brake pedal 204 is released when the brake pedal position data is zero.

The ECU 402 detects the vehicle speed when the brake pedal 204 is released (step 608). The ECU 402 may use the vehicle speed data from the speed sensor 216 and the brake pedal position data from the pedal unit 404 to detect the vehicle speed when the brake pedal 204 is released. In some embodiments, when the brake pedal 204 is released is a brake release time, as illustrated in FIG. 2A and FIG. 2B. In some embodiments, when the brake pedal 204 is released is a final brake release time, as illustrated in FIG. 2C.

The ECU 402 detects, at a determination time, whether the intersection is a green light intersection or a red light intersection based on the vehicle speed when the brake pedal 204 is released (step 510). When the vehicle speed exceeds a speed threshold (e.g., speed threshold 218), the ECU 402 determines the intersection is a green light intersection, and when the vehicle speed is less than the speed threshold, the ECU 402 determines the intersection is a red light intersection. Accordingly, when the vehicle 100 approaches the intersection 102 at a subsequent time, the ECU 402 will use the determined green light coasting distance or red light coasting distance when providing the coasting assistance instruction.

The ECU 402 may include previous green light detections and red light detections when determining whether the intersection 102 is a green light intersection or a red light intersection. The determination time may be a time after the vehicle 100 has travelled through the intersection a sample threshold number of times. For example, the vehicle 100 may have turned at the intersection 121 times, and over the 121 times, the vehicle 100 may have determined a total light count of 121, a green light count of 110 and a red light count of 11. The sample threshold may be 122 times, so when the vehicle 100 turns at the intersection on the 122nd time, the 122nd time may be the determination time. When the total light count does not exceed the sample threshold, no coasting coaching instruction may be displayed.

In some embodiments, the determination time may be the first time the vehicle 100 travels through the intersection, when the vehicle 100 has access to an aggregated total light count, an aggregated green light count, and an aggregated red light count. The vehicle 100 may obtain the aggregate intersection data from the intersection light server 410, for example. Use of the aggregate intersection data by the vehicle 100 may remain subject to exceeding the sample threshold. Therefore, if the aggregate total light count is below the sample threshold, the vehicle 100 may supplement the received aggregate intersection data with a total light count, green light count, and red light count determined by the vehicle 100.

The ECU 402 detects, at an application time, when the vehicle 100 is approaching the intersection 102 (step 612). The ECU 402 may detect when the vehicle 100 is approaching the intersection 102 based on map data stored in the memory 412, and location data detected by the location unit 418.

The display 112 displays, at the application time, a coasting assistance instruction including the green light coasting distance or the red light coasting distance (step 514). The green light coasting distance is displayed when the intersection 102 is a green light intersection, and the red light coasting distance is displayed when the intersection 102 is a red light intersection. The driver of the vehicle 100, using the coasting assistance instruction, is able to maximize regenerative braking using the regenerative brakes 414, thereby improving fuel efficiency.

The determination time may be a first time and the application time may be a second time after the first time. There may be one or more situations where the vehicle 100 approaches the intersection between the determination time and the application time.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that the scope shall not be restricted, except in light of the appended claims and their equivalents.

What is claimed is:

1. A system for adjusting timing of coasting assistance provided by a vehicle that is approaching an intersection where the vehicle will turn or is programmed or scheduled to turn, the system comprising:
    a speed sensor configured to detect vehicle speed data;
    a pedal unit connected to a brake pedal and configured to detect brake pedal position data;
    an electronic control unit (ECU) connected to the speed sensor and the pedal unit, the ECU configured to:
        detect when the brake pedal is engaged and released based on the brake pedal position data,
        detect a vehicle speed when the brake pedal is released based on the vehicle speed data,
        determine, at a determination time, whether the intersection is a green light intersection or a red light intersection based on the vehicle speed when the brake pedal is released, and
        detect, at an application time, when the vehicle is approaching the intersection; and
    a display connected to the ECU and configured to display, at the application time, a coasting assistance instruction including a green light coasting distance when the intersection is the green light intersection or a red light coasting distance when the intersection is the red light intersection.

2. The system of claim 1, further comprising a memory configured to store a total light count, a red light count, and a green light count, and
    wherein the determining whether the intersection is a green light intersection or a red light intersection comprises:
        determining the total light count associated with a total number of times the vehicle travels through the intersection;
        determining the green light count associated with a number of times a green light is present when the vehicle travels through the intersection;
        determining the red light count associated with a number of times a red light is present when the vehicle travels through the intersection;
        determining the intersection is the green light intersection when a ratio of the green light count to the total light count exceeds a frequency threshold; and
        determining the intersection is the red light intersection when the ratio of the green light count to the total light count is less than the frequency threshold.

3. The system of claim 2, wherein determining the green light count comprises, for each time the vehicle approaches the intersection, incrementing the green light count when the vehicle speed exceeds a speed threshold when the brake is released.

4. The system of claim 2, wherein determining the red light count comprises, for each time the vehicle approaches the intersection, incrementing the red light count when the vehicle speed is less than a speed threshold when the brake is released.

5. The system of claim 2, wherein the ECU is further configured to:
    determine whether the total light count exceeds a sample threshold; and
    determine whether the intersection is the green light intersection or the red light intersection when the total light count exceeds the sample threshold.

6. The system of claim 1, wherein the pedal unit is connected to an accelerator pedal and is further configured to detect accelerator pedal data;
    wherein the ECU is further configured to detect when the accelerator pedal is engaged within an acceleration time threshold after the brake pedal is released; and
    wherein the determining whether the intersection is a green light intersection or a red light intersection is based on the vehicle speed when the accelerator pedal is engaged after the brake pedal is released.

7. The system of claim 1, further comprising:
    an intersection light server configured to:
        receive, from a plurality of vehicles, a plurality of total light counts, a plurality of green light counts, and a plurality of red light counts;
        determine, for the intersection, an aggregate total light count associated with an aggregate number of times the plurality of vehicles travelled through the intersection, an aggregate green light count associated with an aggregate number of times a green light was present when the plurality of vehicles travelled through the intersection, and an aggregate red light count associated with an aggregate number of times a red light was present when the plurality of vehicles travelled through the intersection; and
        communicate, to the ECU, the aggregate total light count, the aggregate green light count, and the aggregate red light count, and
    wherein the determining whether the intersection is a green light intersection or a red light intersection comprises:
        determining the intersection is the green light intersection when a ratio of the aggregate green light count to the aggregate total light count exceeds a frequency threshold; and
        determining the intersection is the red light intersection when a ratio of the aggregate red light count to the aggregate total light count is less than the frequency threshold.

8. A vehicle approaching an intersection where the vehicle will turn, the vehicle comprising:
    a speed sensor configured to detect vehicle speed data;
    a pedal unit connected to a brake pedal and configured to detect brake pedal position data;
    an electronic control unit (ECU) connected to the speed sensor and the pedal unit, the ECU configured to:

detect when the brake pedal is engaged and released based on the brake pedal position data,
detect a vehicle speed when the brake pedal is released based on the vehicle speed data,
determine, at a first time, whether the intersection is a green light intersection or a red light intersection based on the vehicle speed when the brake pedal is released, and
detect, at a second time, when the vehicle is approaching the intersection; and
a display connected to the ECU and configured to display, at the second time, a coasting assistance instruction including the green light coasting distance when the intersection is the green light intersection or the red light coasting distance when the intersection is the red light intersection.

9. The vehicle of claim 8, further comprising a memory configured to store a total light count, a red light count, and a green light count, and
wherein the determining whether the intersection is a green light intersection or a red light intersection comprises:
determining the total light count associated with a total number of times the vehicle travels through the intersection;
determining the green light count associated with a number of times a green light is present when the vehicle travels through the intersection;
determining the red light count associated with a number of times a red light is present when the vehicle travels through the intersection;
determining the intersection is the green light intersection when a ratio of the green light count to the total light count exceeds a frequency threshold; and
determining the intersection is the red light intersection when the ratio of the green light count to the total light count is less than the frequency threshold.

10. The vehicle of claim 9, wherein determining the green light count comprises, for each time the vehicle approaches the intersection, incrementing the green light count when the vehicle speed exceeds a speed threshold when the brake is released.

11. The vehicle of claim 9, wherein determining the red light count comprises, for each time the vehicle approaches the intersection, incrementing the red light count when the vehicle speed is less than a speed threshold when the brake is released.

12. The vehicle of claim 9, wherein the ECU is further configured to:
determine whether the total light count exceeds a sample threshold; and
determine whether the intersection is the green light intersection or the red light intersection when the total light count exceeds the sample threshold.

13. The vehicle of claim 8, wherein the pedal unit is connected to an accelerator pedal and is further configured to detect accelerator pedal data,
wherein the ECU is further configured to detect when the accelerator pedal is engaged within an acceleration time threshold after the brake pedal is released;
wherein the determining whether the intersection is a green light intersection or a red light intersection is based on the vehicle speed when the accelerator pedal is engaged after the brake pedal is released.

14. The vehicle of claim 8, wherein the ECU is further configured to receive, from an intersection light server via a transceiver, an aggregate total light count associated with an aggregate number of times the plurality of vehicles travelled through the intersection, an aggregate green light count associated with an aggregate number of times a green light was present when the plurality of vehicles travelled through the intersection, and an aggregate red light count associated with an aggregate number of times a red light was present when the plurality of vehicles travelled through the intersection, and
wherein the determining whether the intersection is a green light intersection or a red light intersection comprises:
determining the intersection is the green light intersection when a ratio of the aggregate green light count to the aggregate total light count exceeds a frequency threshold; and
determining the intersection is the red light intersection when a ratio of the aggregate red light count to the aggregate total light count is less than the frequency threshold.

15. A method of adjusting timing of coasting assistance provided by a vehicle that is approaching an intersection where the vehicle will turn or is programmed or scheduled to turn, the method comprising:
detecting, by a speed sensor, vehicle speed data;
detecting, by a pedal unit connected to a brake pedal, brake pedal position data;
detecting, by an electronic control unit (ECU) connected to the speed sensor and the pedal unit, when the brake pedal is engaged and released based on the brake pedal position data;
detecting, by the ECU, a vehicle speed when the brake pedal is released;
determining, by the ECU at a determination time, whether the intersection is a green light intersection or a red light intersection based on the vehicle speed when the brake pedal is released;
detecting, by the ECU at an application time, when the vehicle is approaching the intersection; and
displaying, by a display connected to the ECU at the application time, a coasting assistance instruction including the green light coasting distance when the intersection is the green light intersection or the red light coasting distance when the intersection is the red light intersection.

16. The method of claim 15, wherein the determining whether the intersection is a green light intersection or a red light intersection comprises:
determining, by the ECU, a total light count associated with a total number of times the vehicle travels through the intersection;
determining, by the ECU, a green light count associated with a number of times a green light is present when the vehicle travels through the intersection;
determining, by the ECU, a red light count associated with a number of times a red light is present when the vehicle travels through the intersection;
determining, by the ECU, the intersection is the green light intersection when a ratio of the green light count to the total light count exceeds a frequency threshold; and
determining, by the ECU, the intersection is the red light intersection when the ratio of the green light count to the total light count is less than the frequency threshold.

17. The method of claim 16, wherein determining the green light count comprises, for each time the vehicle approaches the intersection, incrementing the green light count when the vehicle speed exceeds a speed threshold when the brake is released, and
  wherein determining the red light count comprises, for each time the vehicle approaches the intersection, incrementing the red light count when the vehicle speed is less than a speed threshold when the brake is released.

18. The method of claim 16, further comprising:
determining, by the ECU, whether the total light count exceeds a sample threshold; and
determining, by the ECU, whether the intersection is the green light intersection or the red light intersection when the total light count exceeds the sample threshold.

19. The method of claim 15, further comprising:
detecting, by the pedal unit connected to an accelerator pedal, accelerator pedal data; and
detecting, by the ECU, when the accelerator pedal is engaged within an acceleration time threshold after the brake pedal is released, and
  wherein the determining whether the intersection is a green light intersection or a red light intersection is based on the vehicle speed when the accelerator pedal is engaged after the brake pedal is released.

20. The method of claim 15, further comprising:
receiving, at an intersection light server from a plurality of vehicles, a plurality of total light counts, a plurality of green light counts, and a plurality of red light counts;
determining, by the intersection light server, for the intersection, an aggregate total light count associated with a total number of times the plurality of vehicles travelled through the intersection, an aggregate green light count associated with a total number of times a green light was present when the plurality of vehicles travelled through the intersection, and an aggregate red light count associated with a total number of times a red light was present when the plurality of vehicles travelled through the intersection; and communicating, by the intersection light server to the ECU, the aggregate total light count, the aggregate green light count, and the aggregate red light count, and wherein the determining whether the intersection is a green light intersection or a red light intersection comprises:

determining, by the ECU, the intersection is the green light intersection when a ratio of the aggregate green light count to the aggregate total light count exceeds a frequency threshold, and determining, by the ECU, the intersection is the red light intersection when a ratio of the aggregate red light count to the aggregate total light count is less than the frequency threshold.

* * * * *